Dec. 8, 1942.   L. N. SCHWIEN   2,304,605
VACUUM REGULATOR FOR AIR DRIVEN AIRCRAFT INSTRUMENTS
Filed July 20, 1940
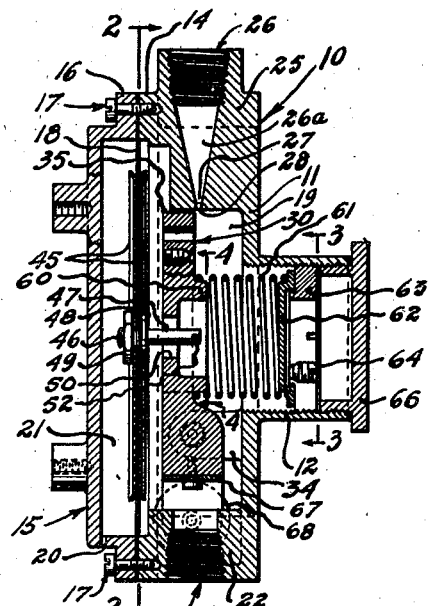
Fig.1.
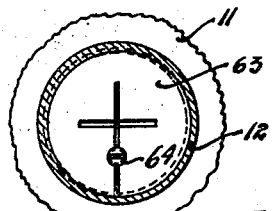
Fig.3.
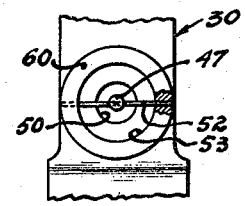
Fig.4.
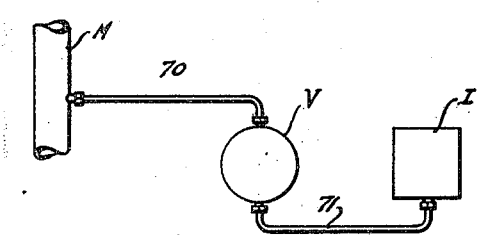
Fig.5.
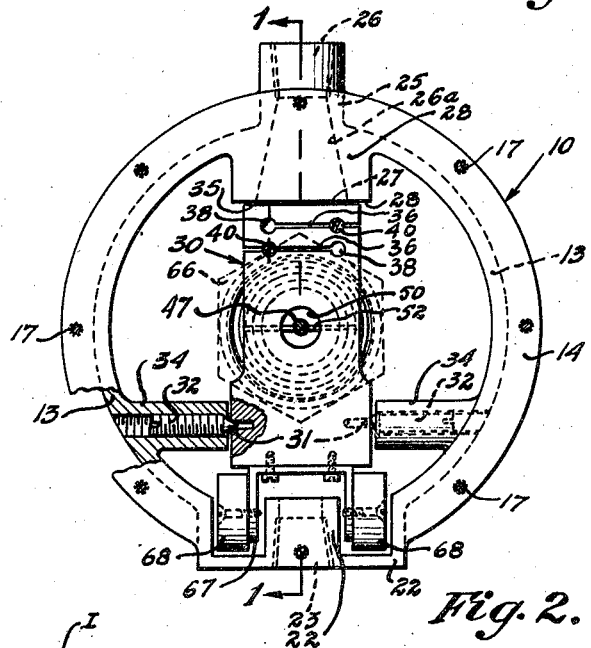
Fig.2.
Fig.6.
Inventor.
Leo Nevin Schwien.
Attorneys.

Patented Dec. 8, 1942

2,304,605

UNITED STATES PATENT OFFICE 2,304,605

VACUUM REGULATOR FOR AIR DRIVEN AIRCRAFT INSTRUMENTS

Leo Nevin Schwien, Los Angeles, Calif.

Application July 20, 1940, Serial No. 346,668

4 Claims. (Cl. 251—126)

This invention relates generally to vacuum regulators, and more particularly to vacuum regulators for regulation of the vacuum applied to air driven aircraft instruments such as gyro instruments.

It is common practice, particularly in the case of small aircraft, to utilize the engine intake manifold as a source of vacuum for air driven aircraft instruments such as gyro instruments and the like. Because of the fluctuations in vacuum created by such a source, or even by a vacuum pump specifically designed for the purpose (such as is used in larger aircraft) there is incorporated between the instrument and the source a vacuum regulator of some kind designed to hold the vacuum applied to the instrument substantially constant despite such fluctuations. Insofar as I am aware, all prior vacuum regulators have operated in one way or another to bleed external air into the system, either as the basis of the operating principle, or as an incident of design. However, where the vacuum source is the intake manifold of the engine, this condition interferes seriously with proper carburetion at closed or nearly closed throttle.

In larger aircraft, in which a special source of vacuum, independent of the engine intake manifold, is ordinarily provided, it is again frequently desirable to avoid intake of external air, especially in the case of installation within a pressurized cabin, since such a regulator may bleed air from the cabin to an undesirable extent.

An object of the present invention is accordingly to provide a vacuum regulator which is entirely closed against entry of external air, and one, therefore, which will not affect in the slightest degree the proper carburetion of the engine, and which, in the case of installation in a pressurized cabin, will not bleed air from the cabin.

The regulator of the present invention operates by opening and closing the vacuum line. A valve element is provided, which seeks a position of balance under the opposing forces of a spring and the vacuum in a chamber whose connection with the vacuum line is controlled by the valve element. One side of this chamber is closed by a flexible diaphragm exposed externally to atmospheric pressure. The spring supports the diaphragm against collapsing owing to the vacuum in the chamber, and the diaphragm accordingly assumes a position, under any given set of pressure conditions, at which the differential pressures externally and internally of the diaphragm are balanced by the spring. The valve element is so linked with the diaphragm that if the vacuum in the chamber increases, the diaphragm moves inwardly, and moves the valve to close off the vacuum source, and vice versa. The vacuum in the chamber is in this way maintained very accurately at the chosen value, which is adjustable merely by adjusting the spring. The chamber is connected to the instrument to be driven, and the latter, operating under the differential of atmospheric pressure and the pressure within the chamber, is accordingly driven at constant velocity. At the same time, the advantage of a sealed system is provided, and there is no possibility of bleeding air into the system such as might have undesirable effects on carburetion of the aircraft engine or in other ways.

Various more detailed objects and accomplishments will appear in the course of the following detailed description of a present preferred embodiment of the invention, reference for this purpose being had to the accompanying drawing, in which:

Fig. 1 is a vertical medial section taken through the vacuum regulator of the present invention, being a view taken on line 1—1 of Fig. 2;

Fig. 2 is a cross section taken on line 2—2 of Fig. 1, with parts broken away;

Fig. 3 is a detail section on line 3—3 of Fig. 1;

Fig. 4 is a detail section on line 4—4 of Fig. 1;

Fig. 5 is a detail enlargement of a portion of Fig. 1; and

Fig. 6 is a diagrammatic view of the vacuum regulator incorporated in a vacuum system for propelling an air-driven aircraft instrument.

In the drawings, the vacuum regulator is designated generally at V, and includes a housing 10 embodying a circular wall 11 formed with a tubular, internally screw-threaded central extension 12, and with a circumferential side wall 13 formed with an external annular flange 14. A cover 15 has a flange 16 meeting flange 14 and secured thereto by means of screws 17. A flexible diaphragm 18, preferably formed of a suitable air tight impregnated fabric, is clamped between flanges 14 and 16, and defines one side of a vacuum chamber 19. A bleeder hole 20 in cover 15 admits atmospheric pressure to the space 21 on the opposite side of diaphragm 18. The bottom side of the housing is formed with a squared bottom portion 22, which is formed with a tapped bore, as indicated at 23, for the connection of a line leading to the aircraft instrument to be served. Vacuum chamber 19 will thus be understood as being in open communication via the bore at 23 with the propelling means of the aircraft instrument.

Housing 10 is formed at the top with a boss 25 within which is formed a downwardly extending tapped bore 26, adapted for connection with the line leading from the source of vacuum. The inner end of bore 26 communicates via passageway 26a with a flat slot or port 27 opening downwardly through a wall surface 28 into chamber 19, the plane of slot 27 being parallel to diaphragm 18, as illustrated. The passageway 26a converges slightly from slot 27 toward bore 26 as seen in the aspect of Fig. 2, but diverges as seen in the plane of Fig. 1, as illustrated, so that the cross-sectional area of the passageway increases gradually from slot 27 to port 26. There is thus avoided sharp edged offsets such as would be conducive to loss of head.

A valve element 30 contained within chamber 19 controls slot or port 27. In the present embodiment of the invention this valve 30 is in the form of a pivoted plate or arm, its lower end portion being trunnions between center points 31 on adjustment screws 32 screw-threaded in bosses 34 integrally formed with housing walls 11 and 13, and its upper end 35 being movable across surface 28 in a manner to open or close port 27. Surfaces 28 and 34 are preferably finished precisely complementary to one another, and have a very close working clearance, both being defined by arcs struck from the trunnion axis of valve plate 30, and are preferably ground in by a lapping operation. To aid in the performance of this lapping operation, and also to aid in establishing the finally desired working clearance between the surfaces, valve plate 30 is preferably provided with means whereby its length may be readily adjusted within small limits. As here shown, parallel slots 36 are cut in opposite edges of valve plate 30, each extending nearly to the opposite edge of the valve plate, and terminating in an enlarged aperture 38, as clearly shown in Fig. 2. These slots intersect bores 39 drilled through the valve plate near the open ends of the slots, as illustrated, and these bores are tapped with taper threads 39a for set screws 40. Set screws 40 screwed in bores 39 progressively spread the slots 36, and in this way the length of the valve plate 30 may be adjusted. By having two such slots, one in each edge of the plate, the adjustment may be made uniform along the end of the plate. At the beginning of the lapping operation, the screws 40 are set up so as to give a proper frictional engagement between surfaces 28 and 35 for a lapping operation. The plate 30 is then simply oscillated back and forth and the surfaces so ground in. The surfaces being properly ground, screws 40 are adjusted to give a very slight working clearance between surfaces 28 and 34, the proper clearance being only sufficient to avoid actual frictional contact. The clearance shown in Figs. 1 and 2 is considerably greater than would be proper in practice, and is shown exaggerated simply for clarity of illustration.

Flexible diaphragm 18 is clamped between two dished plates or washers 45, which are mounted on the screw-threaded end portion 46 of a link 47, between an integral flange 48 and a nut 49 screwed on threaded portion 46. Link 47 projects through an aperture 50 located in the central portion of valve plate 30, and its end is pierced for reception of a cross pin 52, opposite end portions of which are received within apertures 53 in plate 30. Flexible diaphragm 18 is thus linked with pivoted valve plate 30, and any movement of the former occasioned by variations in the pressure differential on its opposite sides is transmitted to the latter.

Seated against the central portion of valve plate 30, and positioned by means of an annular flange 60 formed on said plate, is one end of a coil compression spring 61 which projects into tubular extension 12, and the other end of which is seated on an annulus 62 engaged and held up to position by a split disk 63 screw-threaded within tubular extension 12. After disk 63 has been screwed in sufficiently far to put spring 61 under the desired compression, set screw 64 is inserted (see Fig. 3) which expands the disk and locks it in adjusted position. Cap 66 is then screwed into the end of tubular extension 12.

The lower end of valve plate 30 is equipped with a bracket 67 carrying counterweights 68, which are so positioned and of such weight as to counterweight the portion of valve plate 30 above the trunnions, and also the link 47 and diaphragm plates 45. This permits the regulator to operate with uniform results in all positions.

Fig. 6 shows the vacuum regulator V connected by a vacuum line 70 with a source of vacuum, here assumed to be the intake manifold M of an aircraft engine, and connected by a line 71 with an air driven aircraft instrument I, which may be for instance a gyro instrument, or as any other air propelled instrument. The flexible diaphragm 18 will exert a force on pivoted valve plate 30 depending upon the differential of atmospheric pressure in space 21 on the outer side of the diaphragm and the vacuum within chamber 19 on the inner side of the diaphragm. The valve plate moves under this force to a position at which the force is just balanced by spring 61. Assume that for a given atmospheric pressure and a given vacuum condition within chamber 19, the valve assumes the position illustrated in Fig. 1. If now the pressure in chamber 19 should for any reason tend to decrease, there will be a greater differential of pressure acting inwardly on the diaphragm, and a consequent force exerted on valve 30 tending to move it toward the right (as viewed in Fig. 1) and to compress spring 61. Such movement of valve plate 30 closes down vacuum port 27, and accordingly brings about a compensating increase in pressure in chamber 19. And if under any set of conditions the pressure within chamber 19 should increase, the resulting decrease in differential of pressure on diaphragm 18 allows the latter to move in an outward direction, whereby valve 30 is moved toward the left, and aperture 27 is opened wider, so as to bring about compensating decrease in pressure within chamber 19. By such a process, the sub-pressure or vacuum condition within chamber 19 for which the regulator is adjusted is maintained within very close limits. It may be stated that with the vacuum supply varying up to 30 inches of mercury, the regulator will maintain the pressure differential for which it is adjusted within plus or minus 3%. It will be understood that the chamber 19 is in communication via line 71 with the air driven instrument which is to be propelled, and since the air propelling means of such instrument is working under the differential of atmospheric pressure and the vacuum communicated to it from chamber 19, such differential will likewise be maintained within plus or minus 3% for a vacuum supply varying up to 30 inches of mercury.

A feature of the present vacuum regulator is the low limit of air flow necessary to assure proper operation. Prior vacuum regulators of the general type in question require the air flow to be approximately at least .5 cubic foot per minute, whereas the valve action of the present instrument is capable of operation with flow rates above a minimum of about .25 cubic foot per minute.

Attention is again directed to the fact that the regulator of the present invention operates without bleeding air into the system; in fact the system is sealed tight against admission of atmospheric air from vacuum source to the air-driven instrument. The regulator as herein disclosed also has the advantage of simplicity of parts and avoidance of manually adjusted restricted orifice and needle valves, which require tedious and expensive adjustment. There is also avoided the liability of change in original setting owing to dirt collecting in restricted valves.

I have now described and illustrated one illustrative embodiment of my invention; it will be understood, however, that this is for illustrative purposes only, and that various changes in design, structure and arrangement may be made without departing from the spirit and scope of my invention or of the appended claims.

I claim:

1. In combination, a wall formed with a finished wall surface having a port opening therethrough, a pivoted valve plate having a swinging end movable at working clearance from said wall surface at the location of said port, transverse slots extending into said plate from its opposite edge and terminating near the edges of the plate remote from their open ends, taper threaded bores extending through the plate and intersecting said slots at points located near the open ends of the latter, and set screws screwed in said bores.

2. In a regulator, the combination of a wall surface having a port opening therethrough, a valve arm pivotally mounted in a position with its swinging end presented in opposition to said surface and movable along said surface and across said port as said valve arm rocks on its pivotal mounting, said swinging end of said plate arm having a slight working clearance with said surface, and the swinging end of the rocking valve arm opening and closing the port as it moves across said port, and a counterweight on said valve arm located beyond the pivot mounting of the valve arm from its swinging end.

3. In a regulator, the combination of a wall surface having a port opening therethrough, a valve arm pivotally mounted in a position with its swinging end presented in opposition to said surface and movable along said surface and across said port as said valve arm rocks on its pivotal mounting, said swinging end of said valve arm having a slight working clearance with said surface, and the swinging end of the rocking valve arm opening and closing the port as it moves across said port, transverse slots extending into said arm from its opposite edges and terminating near the edges of the arm remote from their open ends, taper threaded bores extending through the arm and intersecting said slots at points located near the open ends of the latter, and set screws screwed in said bores.

4. In a regulator, the combination of a wall surface having a port opening therethrough, a pivotally mounted valve arm having a portion spaced from the pivot axis of said mounting presented in opposition to said surface and movable along said surface and across said port to open and close said port as said valve arm rocks on its pivotal mounting, said portion of said arm having a slight working clearance with said surface, and a counterweight connected with said valve arm positioned beyond the pivotal mounting of said arm from said portion of said arm that opens and closes said port.

LEO NEVIN SCHWIEN.